UNITED STATES PATENT OFFICE.

JUAN CRAVERI, OF BUENOS AYRES, ARGENTINA.

IGNITING COMPOSITION FOR MATCHES.

SPECIFICATION forming part of Letters Patent No. 660,365, dated October 23, 1900.

Application filed August 20, 1897. Serial No. 648,973. (No specimens.)

*To all whom it may concern:*

Be it known that I, JUAN CRAVERI, a citizen of the Kingdom of Italy, residing at No. 420 Calle Belgrano, in the city of Buenos Ayres, Argentina, have invented certain new and useful Improvements in Sulfocyanogen Compounds for Matches, of which the following is a specification.

This descriptive account specifies certain compositions which I have discovered may be applied to the manufacture of matches, whereby the use of phosphorus, live or amorphous, is entirely dispensed with in the manufacture of matches or wax tapers of whatever class. The danger of using live phosphorus in this industry is well known and the serious troubles caused to the workers in the manipulation of the paste. The effluvia which arises in spite of all the precautions which have been taken in this industry causes serious danger to the health of the workers. An infinite number of cases of phosphoric necrosis of the bones, deformities of the jawbones, and other very serious infirmities are cited by Broca, De Langenhagen, and other authorities. The facility with which phosphorus ignites in contact with the air is another serious danger which has required careful consideration in this industry, and special precautions have been adopted, which notwithstanding have not given the desired result. The packing itself of the matches causes daily losses which become felt at the end of the month, for in spite of all the precautions which the packers may take in removing the dried matches from the drier very frequently they ignite and cause the total loss of all the contents of the apparatus, this without considering that lucifer matches are poisonous and within the reach of all who are criminally disposed or for self-poisoning, voluntary or involuntary. With the substances which I employ for the manufacture of matches all these inconveniencies disappear, no dangerous effluvia injurious to the health of the workers arises during the manufacture of the matches, nor any danger whatever of combustion, the matches are dried with greater rapidity and are quite unaffected by a moist atmosphere. Valuing the cost of manufacturing industrially shows results nearly fifty per cent. less than the cost of the actual manufacture with the base of phosphorus. The specific weight of my paste being much less it results that with an equal weight of paste a larger quantity is obtained.

I employ for the manufacture of my paste the compounds of sulfocyanogen, the term "sulfocyanogen" compounds being used here and in the claim to include its isomerides and polymerides, alone or in presence of aromatics, nitro derivatives, and compounds of xanthic acid. Thus, for example, persulfocyanic acid, cyanogen persulfid, nitronaphthalene, the xanthate of potassium, and charcoal form an excellent combustible mixture, which in contact with oxidizing agents, like the chlorate of potassium and the peroxid of lead, form a mixture which can be ignited by simple friction on any rough substance whatever. With the object of causing the said compound to adhere to the wax tapers or wood of the matches I employ gelatin as a viscous or gelatinous medium.

An excellent paste can be produced, with all the advantages of phosphorus and without any of the dangers and inconveniencies which occur in using it, by employing the following formula in the proportions given, which, however, may be varied: persulfocyanic acid, two parts; cyanogen persulfid, four parts; nitronaphthalene, two parts; xanthate of potassium, one part; charcoal, one part; chlorate of potassium, twenty parts; peroxid of lead, fifty parts; trisulfid of antimony, ten parts, and gelatin or fine glue, ten parts. The paste is prepared by mixing these constituent parts in the order indicated without the gelatin, though they can also be mixed indiscriminately. Proceed then to dissolve a sufficient quantity of gelatin in warm water and pour it warm upon the mixture in order to obtain a pulp or paste of sufficient consistency to adhere to the tapers or wood of the matches, drying these afterward, first by means of dry air produced by means of an artificial current and then by drying them in a stove in the manner used in this industry. When these matches are ignited by friction on a rough surface, no dangerous sparks are produced, the heads burn instantly, as might be seen from the component parts which form the paste, and the quantity of nitronaphthalene and xanthate of potassium is so small that no intoxicating effects can be produced.

I disclaim the use of the sulfocyanides of the heavy metals.

Having explained thus the nature of my invention and the manner in which it is practically carried out, that which I claim as my absolute property and invention is—

A composition for matches ignitible by friction, containing persulfocyanic acid, cyanogen persulfid, nitronaphthalene, xanthate of potassium, peroxid of lead, trisulfid of antimony, charcoal, chlorate of potassium, and glue.

In testimony that I claim the foregoing as my invention I have signed my name in presence of two subscribing witnesses.

JUAN CRAVERI.

Witnesses:
GUSTAVO M. BREUER,
PEDRO A. BREUER.